United States Patent
Eros et al.

(10) Patent No.: US 6,863,286 B2
(45) Date of Patent: Mar. 8, 2005

(54) INFANT CARRIER-RECEIVING COMPONENT WITH INDICATOR

(75) Inventors: Peter Eros, Vandalia, OH (US); Paul Fair, Denver, CO (US); Donald Schumacher, Dayton, OH (US); David Dranschak, Englewood, OH (US)

(73) Assignee: Evenflo Company, Inc., Vandalia, OH (US)

( * ) Notice: Subject to any disclaimer, the term of this patent is extended or adjusted under 35 U.S.C. 154(b) by 0 days.

(21) Appl. No.: 10/298,320

(22) Filed: Nov. 18, 2002

(65) Prior Publication Data

US 2004/0094923 A1 May 20, 2004

(51) Int. Cl.⁷ .......................... B62B 7/00; B60R 21/32; A47C 1/08; B60D 1/28; G01D 11/00
(52) U.S. Cl. .............. 280/47.38; 280/735; 297/256.16; 297/250.1; 180/271; 116/200; 340/573.1; 340/457.1
(58) Field of Search .......................... 280/47.38, 47.39, 280/47.4, 47.35, 62, 63, 65, 79, 87.01, 87.05, 639, 641, 642, 643, 647, 650, 651, 652, 653, 654, 655.1, 657, 658, 659, 735; 340/573.1, 665, 667, 686.2, 682.1, 687; 297/250.1, 256.16, 130; 200/85 R, 85 A; 116/200, 173; 180/271, 273

(56) References Cited

U.S. PATENT DOCUMENTS

| 4,634,177 | A | | 1/1987 | Meeker |
|---|---|---|---|---|
| 4,874,182 | A | | 10/1989 | Clark |
| 4,896,894 | A | | 1/1990 | Singletary |
| 5,058,283 | A | | 10/1991 | Wise et al. |
| 5,478,135 | A | * | 12/1995 | Kain ..................... 297/256.16 |
| 5,581,234 | A | * | 12/1996 | Emery et al. ............ 340/457.1 |
| 5,668,526 | A | * | 9/1997 | Collins ........................ 340/326 |
| 5,690,356 | A | * | 11/1997 | Lane, Jr. ..................... 280/735 |
| 5,772,279 | A | | 6/1998 | Johnson, Jr. |
| 5,882,035 | A | * | 3/1999 | Munro ........................ 280/735 |
| 6,039,455 | A | * | 3/2000 | Sorenson ..................... 362/142 |
| 6,070,890 | A | | 6/2000 | Haut et al. |
| 6,089,653 | A | | 7/2000 | Hotaling et al. |
| 6,189,914 | B1 | | 2/2001 | Worth et al. |
| 6,209,892 | B1 | | 4/2001 | Schaaf et al. |
| 6,347,832 | B2 | * | 2/2002 | Mori ..................... 297/256.13 |
| 6,367,875 | B1 | * | 4/2002 | Bapst ....................... 297/250.1 |
| 6,393,348 | B1 | * | 5/2002 | Ziegler et al. ................ 701/45 |

* cited by examiner

Primary Examiner—Christopher P. Ellis
Assistant Examiner—G B Klebe
(74) Attorney, Agent, or Firm—Taft, Stettinius & Hollister LLP

(57) ABSTRACT

An infant carrier-receiving component including a frame shaped to receive an infant carrier thereon, and an indicator located on said frame, wherein the indicator indicates when the infant carrier is located in a predetermined position on the frame.

41 Claims, 7 Drawing Sheets

INFANT CARRIER-RECEIVING COMPONENT WITH INDICATOR

The present invention is directed to a stroller or other component for receiving an infant carrier, and more particularly to a stroller or other component including an indicator for indicating when an infant carrier is coupled to the stroller or component.

BACKGROUND

Travel systems are often used to support and transport infants, children, toddlers and juveniles. Such travel systems can include an infant carrier that is shaped and configured to securely receive an infant therein or thereon. The travel system may also include a stroller, car seat base, or various other components which are shaped to releasably or removably receive the infant carrier thereon. The infant carrier and/or infant carrier-receiving component may include various latches or locking mechanisms to secure the infant carrier to the infant carrier-receiving component.

Many existing travel systems do not provide any feedback or indication to indicate when the infant carrier is or is not properly or securely coupled to the infant carrier-receiving component. Accordingly there is a need for an infant carrier-receiving component or an infant carrier with an indicator that provides feedback so that the user can conveniently determine when the infant carrier is and/or is not coupled to the infant carrier-receiving component.

SUMMARY

In one embodiment, the invention is an infant carrier-receiving component including a frame shaped to receive an infant carrier thereon, and an indicator located on said frame, wherein the indicator indicates when the infant carrier is located in a predetermined position on the frame. In another embodiment, the invention is an infant carrier with a latch indicator to indicate when the infant carrier is located in a predetermined position on a frame. Other objects and advantages of the present invention will be apparent from the following description and the accompanying drawings.

DETAILED DESCRIPTION

Figure 1:
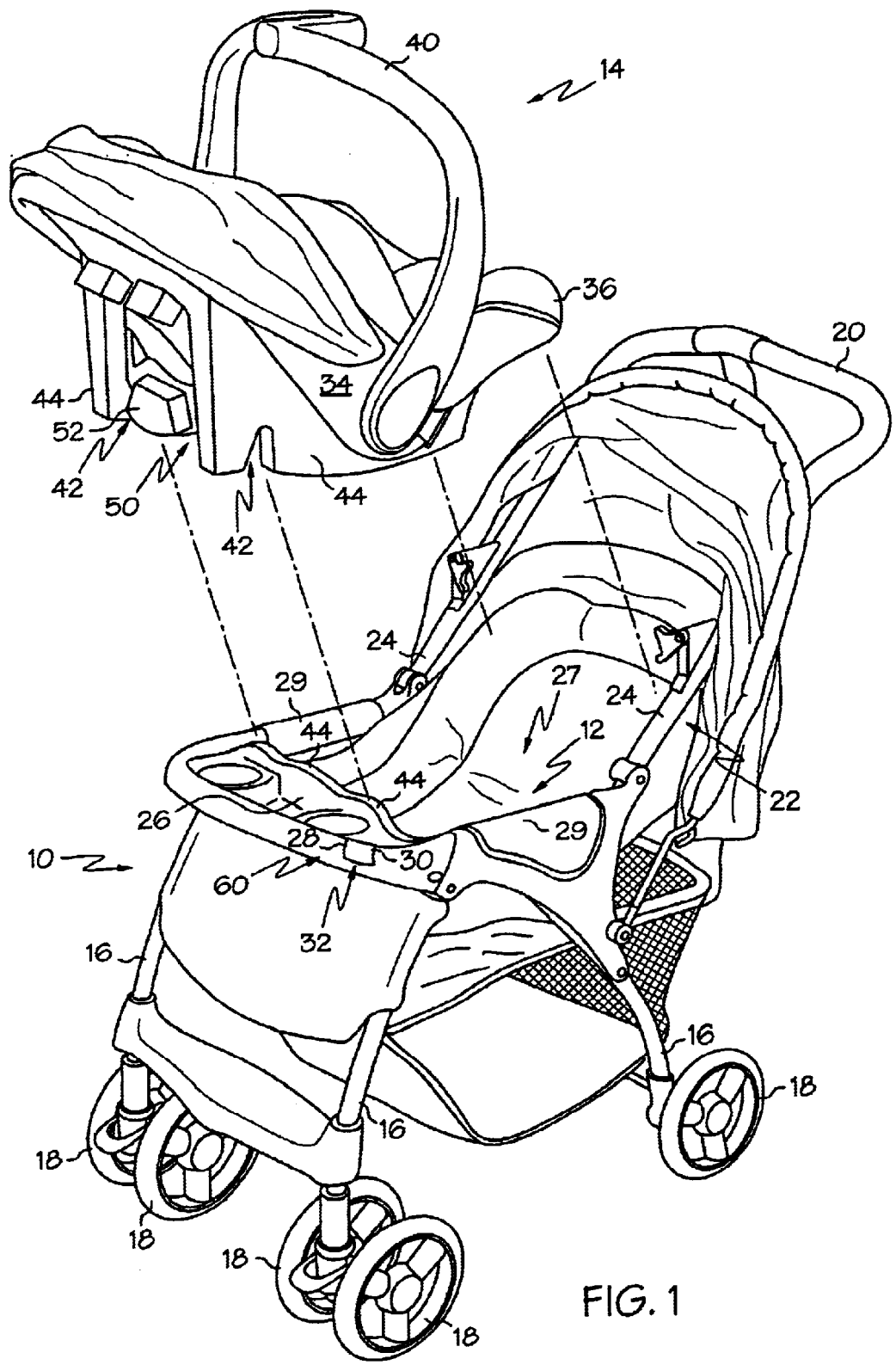
FIG. 1 is a front perspective view of a stroller and an infant carrier spaced apart from the stroller.
Figure 2:
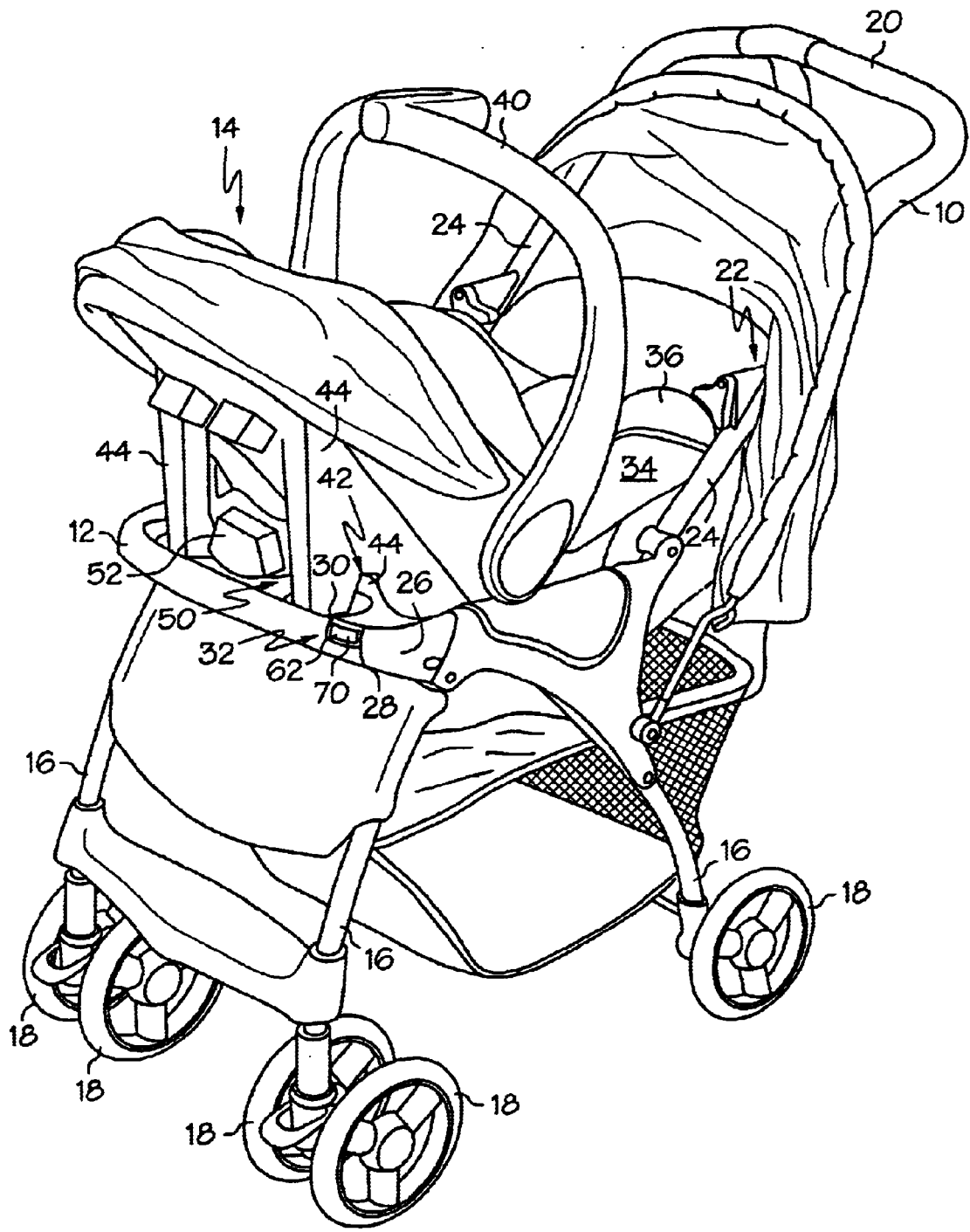
FIG. 2 is a front perspective view of the stroller and infant carrier of FIG. 1, with the infant carrier coupled to the stroller.

As shown in FIGS. 1 and 2, a stroller 10 may include a frame 12 shaped to releasably receive an infant carrier 14 thereon. Although the frame 12 may include various components of the body of the stroller 10, in one embodiment the frame 12 may include a tray 26 and portions of the arm rests 29 of the stroller 10. The stroller 10 may also include a set of generally downwardly-extending legs 16 with each leg 16 including at least one wheel 18 coupled to an end thereof. The stroller 10 may include a handlebar 20 that is shaped and located to be gripped by an operator such that the operator can roll the stroller 10 in the desired manner and direction. The stroller 10 may also include a connecting structure 22 extending between the handlebar 20 and the frame 12. The connecting structure 22 may include a pair of generally parallel tubular members 24 extending generally upwardly and rearwardly from the frame 12, with each member 24 being coupled to opposite sides of the handlebar 20. Portions of the frame 12 may include or be located on or adjacent to lower portions of the tubular members 24.

The stroller 10 may include a retaining bar 26, such as a tray or other structure, located across the front of the seating area 27 of the stroller 10 such that the retaining bar 26 is located in front of an occupant when the occupant is seated in the stroller 10. The tray 26 may be pivotable to a generally vertical position to allow a child to be located in the seating area 27. The retaining bar 26 may include a cut-out section 28 with a clear, transparent or translucent portion of material 30 located in the cut-out section to form a window 32.

Figure 6:
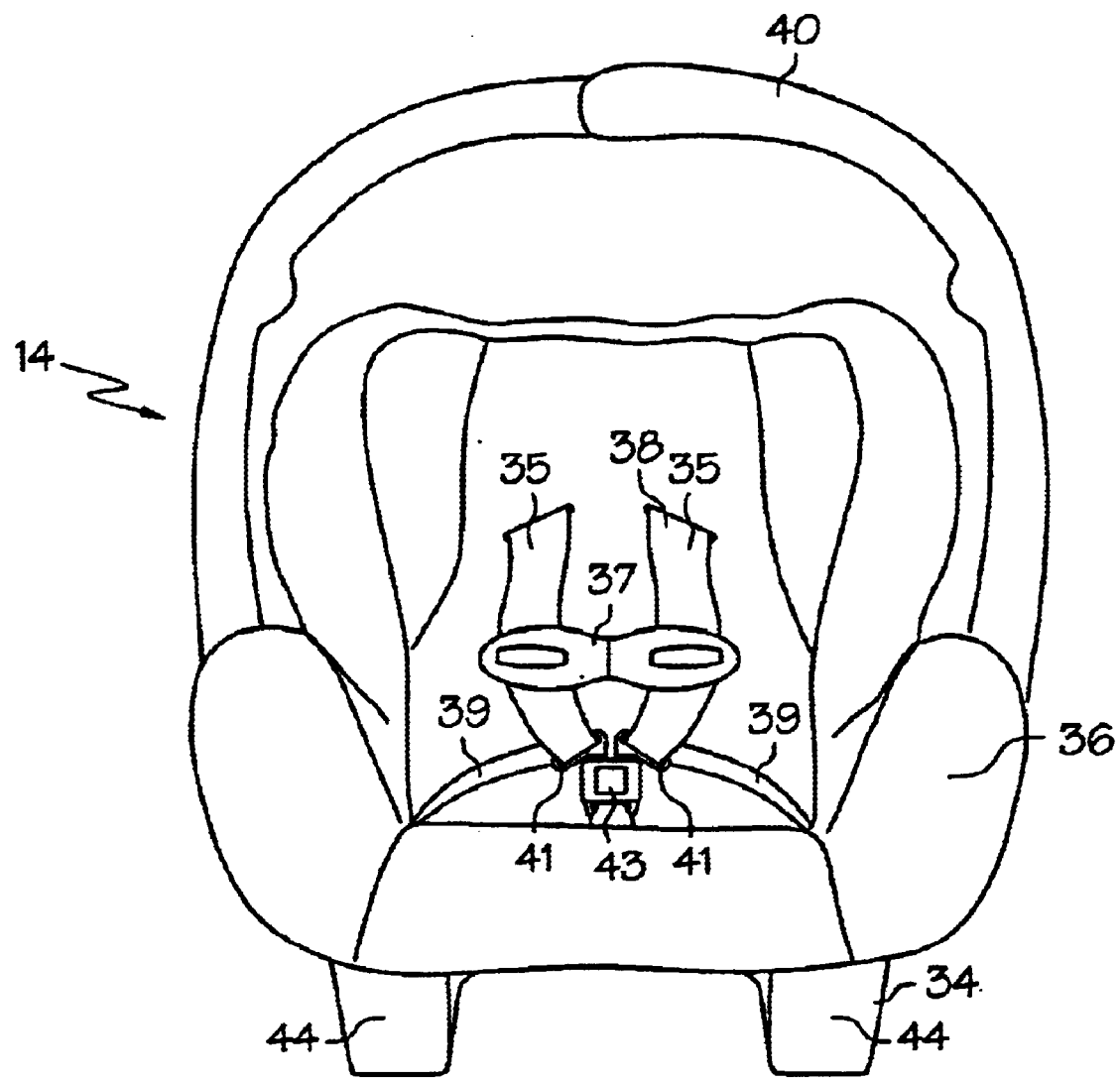
FIG. 6 is a front view of an infant carrier.

The infant carrier 14 may be a standard infant carrier of a type well know in the art, and may include a generally rigid shell 34 with a soft, cushioned covering 36 located thereon. The infant carrier 14 may include a harness or set of straps 38 (see FIG. 6), such as a 5-point harness or the like, located thereon to securely retain an occupant on or in the infant carrier 14. The harness 38 may include a set of shoulder harnesses 35 shaped and located to fit over the shoulder of an occupant, with a chest clip 37 releasably connecting the shoulder harnesses 35. The harness 38 may include a pair of lap belts 39 shaped and located to lie on the lap of an occupant. The harness 38 may also include a pair of tongue member 41, each tongue member being slidable along an associated belt 35, 37, and releasably coupled to a buckle 43. The infant carrier 14 may include a pivotable handle 40 such that an adult or operator can grip the handle 40 and carry the infant carrier 14 by the handle 40.

The infant carrier 14 may be shaped to be releasably coupled to the stroller 10. In particular, the infant carrier 14 may include a pair of recesses 42 (FIG. 1), with each recess 42 being located in the bottom edge of a support wall 44. Each recess 42 may be shaped to receive a protrusion 44 of the retaining bar 26 therein.

The infant carrier 14 may include a locking mechanism, generally designated 50, that is movable between a locked position and an unlocked position. The locking mechanism 50 may be biased into its locked position and shaped and arranged such that when the retaining bar 26 is received in the recesses 42, the locking mechanism 50 engages or grips the retaining bar 26 to couple the infant carrier 14 to the retaining bar 26 and stroller 10. The locking mechanism 50 may be shaped such that the locking mechanism 50 automatically engages the retaining bar 26 when the retaining bar 26 is received in the recesses 42. The infant carrier 14 may include an actuator 52 operatively coupled to the locking mechanism 50 such that the actuator 52 can be operated (such as by lifting the actuator 52 upwardly) to operate or release the locking mechanism 50. When the locking mechanism 50 is released (i.e., moved to its unlocked position), such as by operating the actuator 52, the infant carrier 14 may be able to be lifted off of the frame 12.

Figure 7:
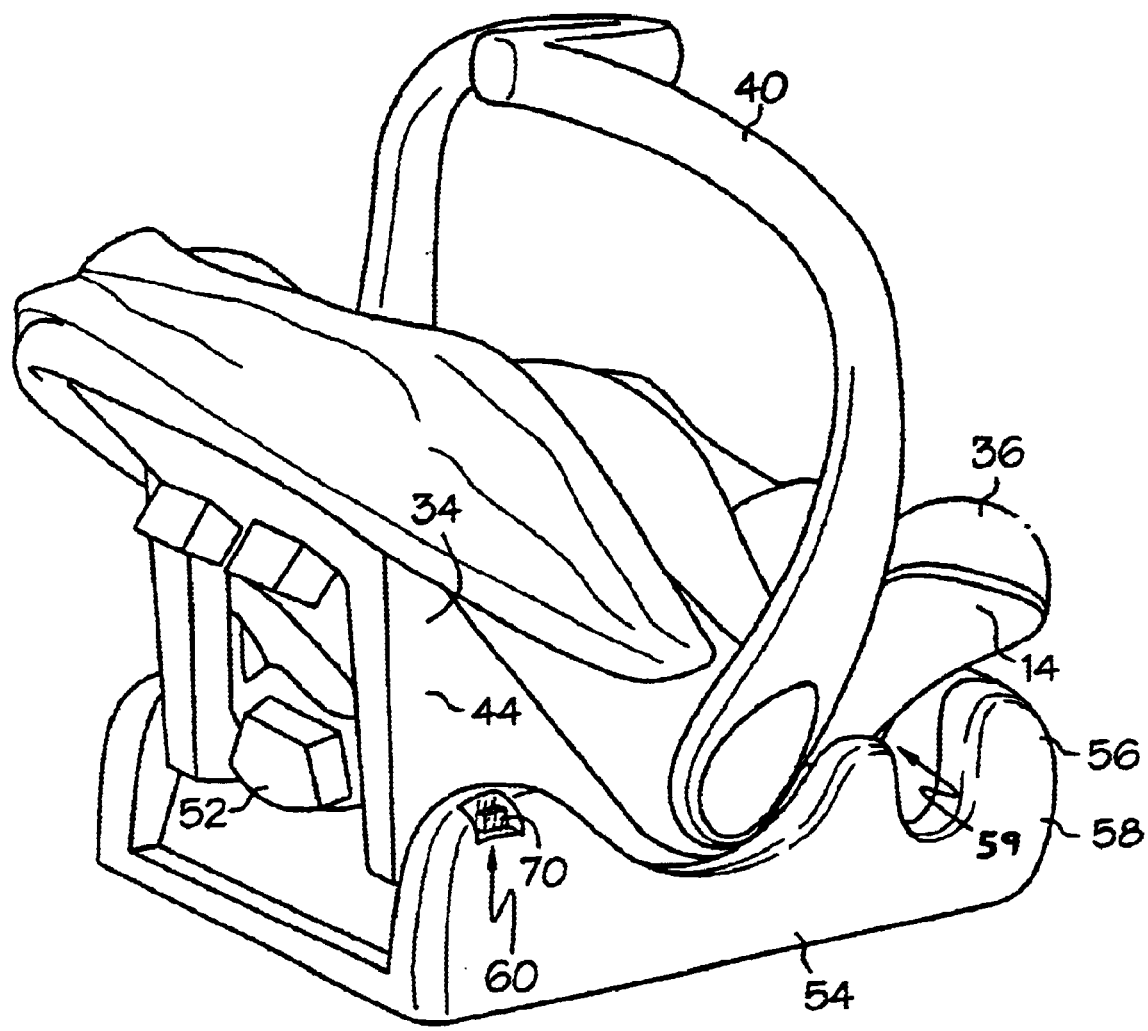
FIG. 7 is a perspective view of an infant carrier coupled to a car seat base.
Figure 8:
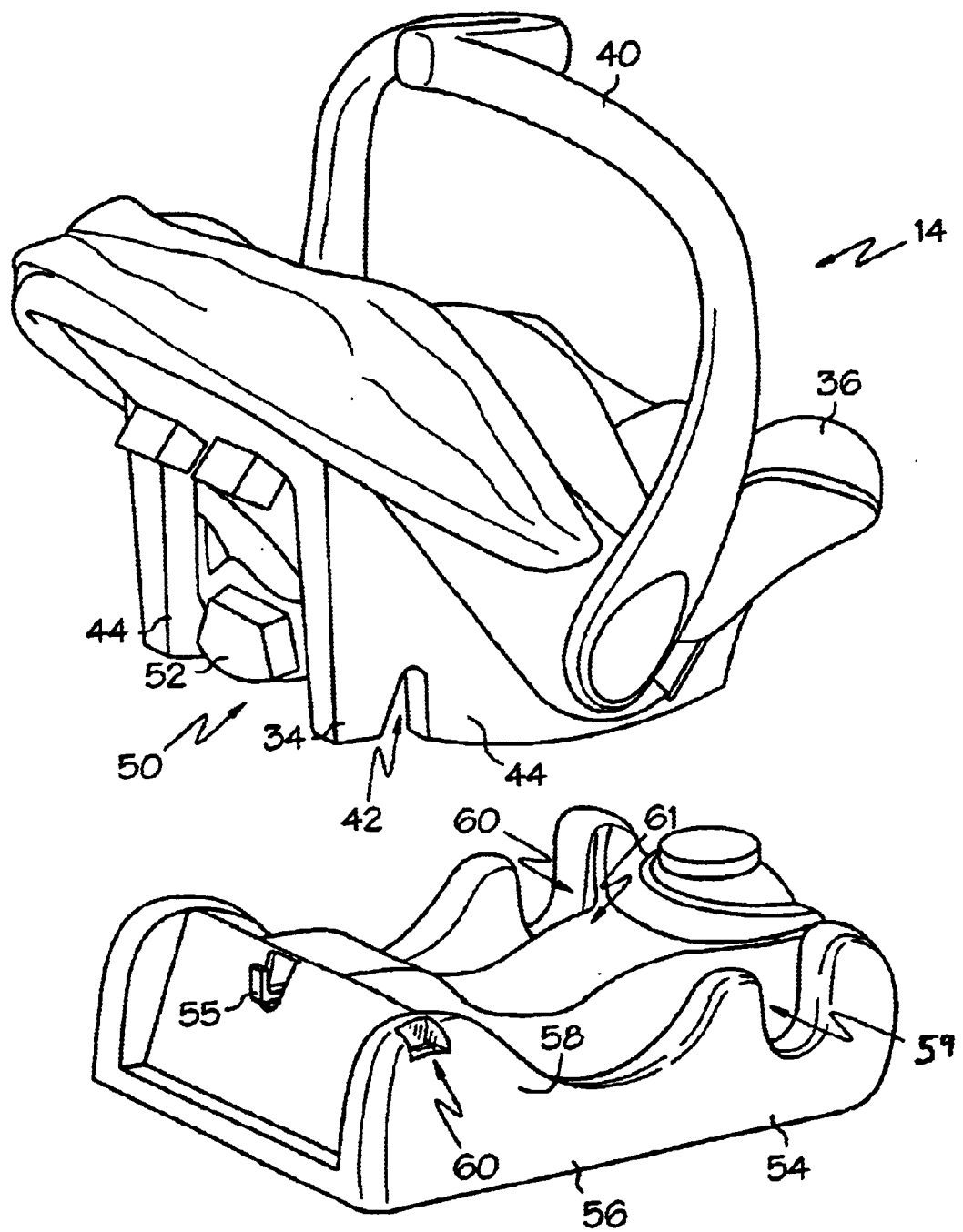
FIG. 8 is a perspective view of the infant carrier of FIG. 7 coupled to the car seat base of FIG. 7.

The infant carrier 14 may also be attachable to a car seat base 54, as shown in FIGS. 7 and 8. The car seat base 54 may include a car seat base body 56 and a frame 58, and may be shaped to be releasably coupled to a vehicle seat. The car seat base 54 may include a belt path, generally designated 59, which can receive a vehicle seat belt therein or therethrough to couple the car seat base 54 to a vehicle seat. The car seat base may include a recess 61 shaped to receive the lower end of the infant carrier 14 therein. Furthermore, the car seat base 54 may include a locking mechanism (not shown), which can securely couple the infant carrier 14 to the car seat base 54. The locking mechanism of the car seat base 54 may be operatively coupled to an actuator 55. Alternately, or in addition, the locking mechanism 50 of the infant carrier 14 may be used to couple the infant carrier 14 to the car seat base 54.

When the infant carrier 14 is coupled to the car seat base 54 by the locking mechanism 50 and/or the locking mechanism of the car seat base 54, the actuator 52 may be operatively coupled to both or either of the locking mechanisms such that operation of the actuator 52 moves both locking mechanisms to their unlocked positions. For example, movement of the actuator 52 may cause movement or actuation of the actuator 55 when the infant carrier 14 is coupled to the car seat 54. Alternately, a separate actuator may be used to actuate the locking mechanism of the car seat base 54 and/or locking mechanism 50. Once the locking mechanisms are released (i.e. moved to their unlocked positions), the infant carrier 14 may be able to be lifted off of the car seat base 54.

Of course, the infant carrier 14 may be able to be releasably coupled to stroller 10, car seat base 54 or other frame or infant carrier-receiving components in a wide variety of manners other than those described above and shown herein without departing from the scope of the invention. For example, the stroller 10 need not include the retaining bar 26 that is received in the recesses 42, and the car seat base 54 and/or stroller 10 may instead or in addition include various other locking mechanisms beyond the locking mechanism 50. Furthermore, the stroller 10 may include a locking mechanism for coupling the infant carrier thereto. Thus, each of the infant carrier 14, stroller 10, car seat base 54, or other infant carrier-receiving components may or may not include a locking mechanism.

Figure 3:
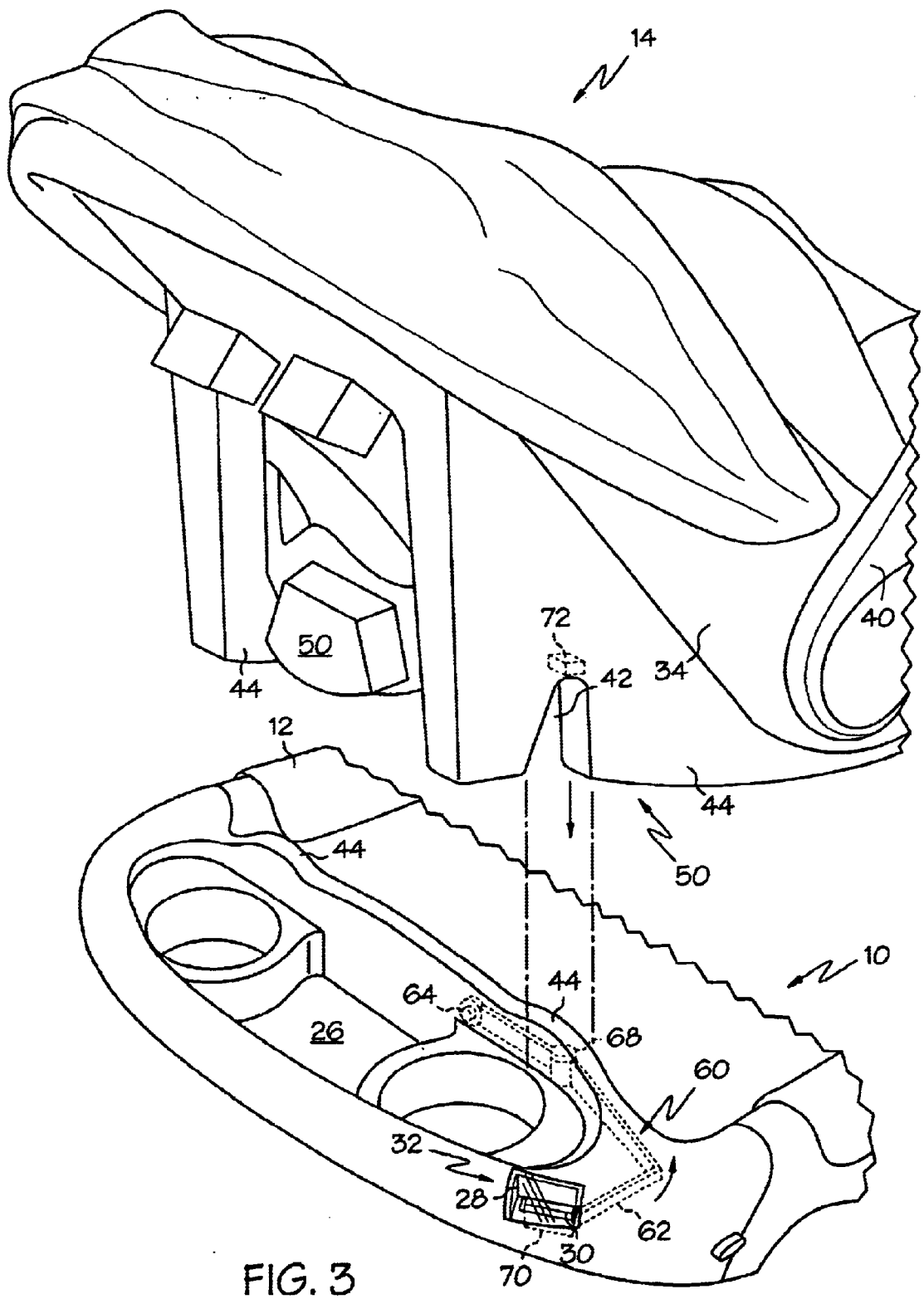
FIG. 3 is a front detail perspective view of the stroller and infant carrier of FIG. 1, showing one embodiment of the latch indicator.
Figure 4:
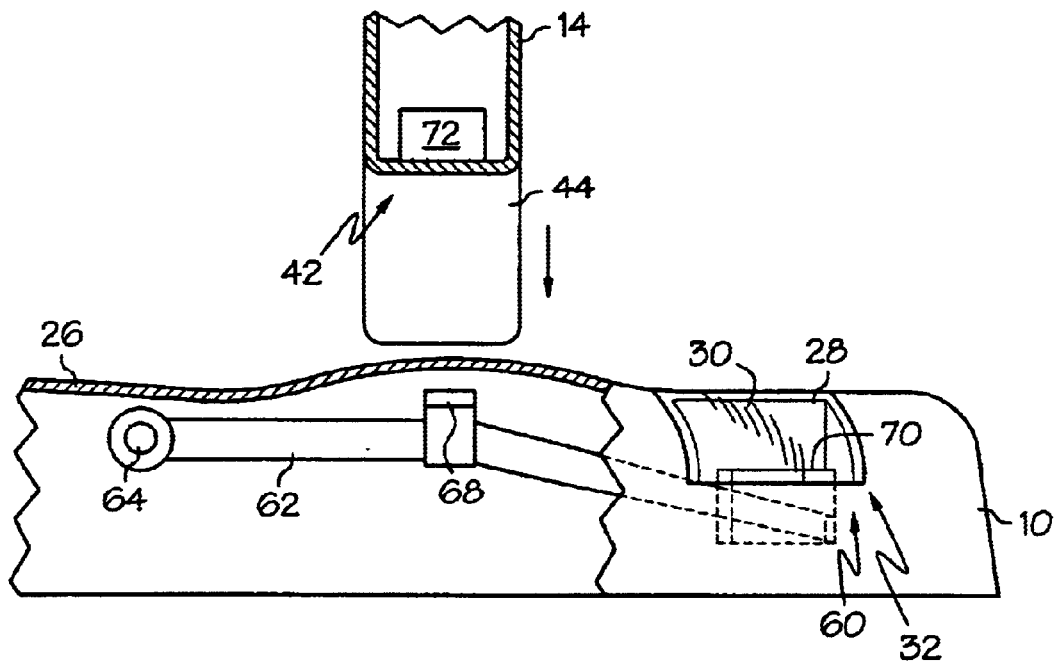
FIG. 4 is a front partially cutaway of stroller and infant carrier showing the latch indicator of FIG. 3 in its inactivated position.
Figure 5:
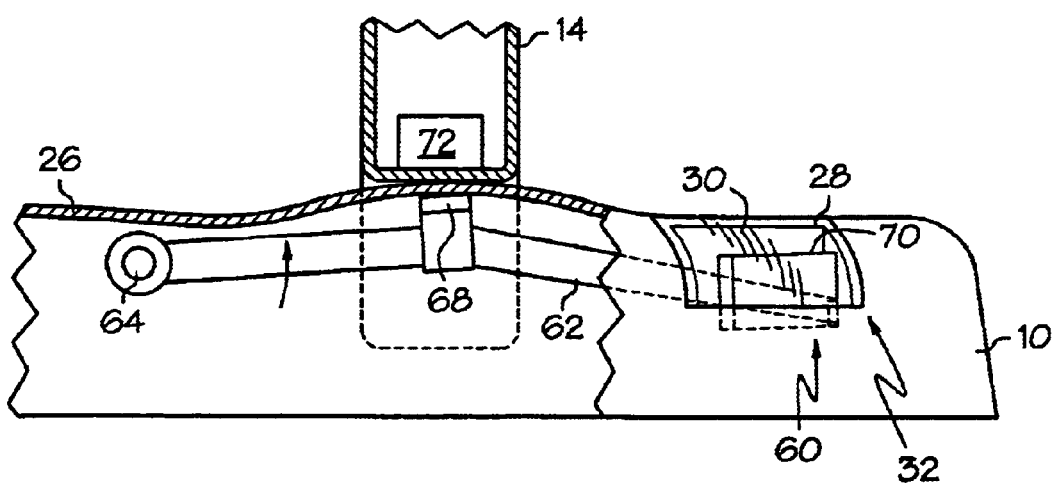
FIG. 5 is a front partial cutaway of stroller and infant carrier showing the latch indicator of FIG. 3 in its activated position.

As best shown in FIGS. 3–5, the stroller 10 may include a latch indicator, generally designated 60, which provides feedback or a visual indication when the infant carrier 14 is and/or is not properly coupled to or located on the stroller 10. The latch indicator 60 may be located on or in the retaining bar 26 of the stroller 10, although the latch indicator 60 can be located on various other parts of the stroller 10. The indicator 60 may include an arm 62 that may be pivotally coupled to the tray 26 at pivot point 64. In the absence of any outside forces, the arm 62 may be located in its lower, or unactivated, position, as shown in FIG. 3, as biased by gravity. Of course, the arm 62 may also be biased into its upper, or activated position, for example through the use of a counterweight. The latch arm 62 may include a magnet 68 spaced away from the pivot point 64 and may include an indicator portion 70 located at a distal end thereof.

The indicator portion 70 may include various visible indicia located thereon, such as a color (i.e., green), a pattern of colors and/or textures, reflective materials, or nearly any visible materials, colors, etc., or nearly any visible characteristic which may be distinctive or eye catching. The indicator portion 70 may include at least one visual property that is different from the visual property of any surrounding components (i.e. the retaining bar 26 or frame 12) so that a user can quickly locate and identify the indicator portion 70.

The infant carrier 14 may include a metallic component 72, such as a steel slug, located on a portion of the infant carrier 14 that is located adjacent to the magnet 68 when the infant carrier 14 is securely coupled to the frame 12. For example, as shown in FIGS. 3 and 4, the slug 72 may be located adjacent a recess 42 of the infant carrier 14. As shown in FIG. 5, when the infant carrier 14 is securely coupled to the frame 12 (i.e., the retaining bar 26 is received in the recesses 42), the magnet 68 and slug 72 can interact to cause the arm 62 to pivot from its lower or unactivated position (FIGS. 1, 3 and 4) into its upper or notification position (FIGS. 2 and 5).

When the arm 62 is in the notification position, the notification portion 70 of the arm 62 may be visible through the majority of the window 32 so that the user may know that the infant carrier 14 is securely coupled to the stroller 10. When the infant carrier 14 is detached from the frame 12 and the steel slug 72 is spaced sufficiently from the magnet 68, the latch arm 62 will return to its lower position (FIGS. 1, 3 and 4), as moved by gravity, so that the indicator portion is no longer visible through the window, or is not visible through the majority of the window 32. Thus, the arm 62 is biased into its lower position by any of a wide variety of manners, such as gravity, springs, magnets, mechanical arrangements, etc.

Thus the latch indicator 60 can provide feedback to a user when the infant carrier 14 is securely coupled to the frame 12. This feature provides convenience to the operator/user so that the user can determine if addition steps are required to secure the infant carrier 14 to the frame 12. For example, the indicator portion 70 of the latch arm may have a green color thereon that is visible through the window 32 when the latch arm 62 is in its notification position to communicate to the user that the infant carrier 14 is securely coupled to the stroller 10. In this case, when the green indicator portion 70 is not visible through the window 32, the user may know that the infant carrier 14 may not be coupled to the stroller 10. The magnet 68 and steel slug 72 may be selected such that the arm 62 remains in its unactivated position unless the infant carrier 14 is properly seated on the frame 12. For example, if the infant carrier 14 is merely resting on the retaining bar 26, and the retaining bar 26 is not received in the recesses 42, the magnetic forces between the slug 72 and the magnet 68 may be sufficiently weak that the arm 62 remains in its unactivated position.

Thus, the latch indicator 60 may be configured such that a portion of the latch indicator 60 (i.e., the notification portion 70 with the color green) is visible when the infant carrier 14 is securely coupled to the frame 12, and that the indicator 60 (or the notification portion 70) is generally not visible through the window 32 when the infant carrier 14 is not coupled to the stroller 10. Alternately, or in addition, the indicator portion 70 may include a portion with a visual characteristic (i.e., the color red) that is visible when the latch 60 is in its inactivated position. In this manner, the latch indicator 60 can provide a positive indication to the user when the infant carrier 14 is not securely coupled to the frame 12.

Thus, in this case a first portion of the notification portion 70 or latch indicator 60 (i.e. a portion with the color green) may be visible through the window when the infant carrier 14 is coupled to the frame 12, and a second portion of the notification portion 70 or latch indicator 60 (i.e. a portion with the color red) may be visible through the window 32 when the infant carrier 14 is not coupled to the frame 12. Alternately, the notification portion 70 or latch indicator 60 may include a portion (i.e. a portion with the color red) that is visible through the window 32 when the infant carrier 14 is not coupled to the frame 12, and the latch indicator 60 (or the notification portion 70) may generally not be visible when the infant carrier 14 is coupled to the frame 12.

Further alternately, a notification portion, or a portion of the latch indicator 60, may be located on a non-movable portion of the stroller body (by "non-movable" it is meant a portion that is not located on the latch arm 62 in the illustrated embodiment). For example, the notification portion may include indicia (such as the color red or text (i.e. "Not Latched")) that is printed on the inner surface of the tray 26 of the stroller 10 and is generally visible through the window 32 when the latch indicator 60 is in its unactivated (i.e. lower) position. When the latch indicator 60 is in it activated (i.e. upper) position, the latch indicator 60 may generally cover the notification portion located on the non-movable portion of the stroller body. In this case, the notification portion 70 of the latch indicator 60 may include indicia (i.e. the color green or text (i.e. Latched)) that is generally visible through the window 32, or the notification portion 70 of the latch indicator 60 may not include any indicia, and may simply generally obscure the indicia/notification portion on the non-movable portion of the stroller body when the latch indicator 60 is in its unactivated position. Yet further alternately, the stroller body may include indicia (such as the color green or text (i.e. "Latched")) that located on a non-movable portion of the stroller body that is generally visible when the latch indicator 60 is in it activated position, but is generally obscured by the latch arm 62 when the latch indicator 60 is in its unactivated position. Thus, portions of the latch arm 62 which cover or obscure other indicia can be considered a notification portion 70, even if in this case the notification portion 70 does not itself include any indicia thereon.

If desired, the positions of the magnet 68 and the slug 72 can be reversed such that the magnet 68 is located on the infant carrier 14 and the slug 72 is located on the stroller 10. Further, instead of using a magnet 68 and a slug 72, two magnets may be used. In this case, the magnets may be arranged to use either the attractive or repulsive forces of the magnets to cause movement/triggering of the latch indicator 60. Additionally, the infant carrier 14 and/or stroller 10 may include any of a wide variety of other mechanisms or means, beyond the magnet/slug arrangement, for moving the latch arm 62 between its upper and lower positions. For example, the stroller 10 and/or infant carrier 14 may include various mechanical components that cause different portions of the indicator portions 70 to be generally visible or generally hidden from view, depending upon the location of the infant carrier 14.

Further alternately, the latch arm 62 may include a portion that protrudes slightly upwardly above the retaining bar 26 when the infant carrier 14 is not located on the frame 12, and the infant carrier 14 may engage the protruding portion of the latch arm 62 and cause the latch arm 62 to pivot to its notification position when the infant carrier 14 is located on the frame 12. Furthermore, any of a wide variety of mechanical levers, arms, electronic sensors, switches and the like may be used to cause a change in condition of the latch indicator 60 and/or movement of the notification portion 70. For example, instead of a pivotable arm 62, the frame 12 may include a movable cover which selectively covers or uncovers a visual indicator, or a laterally movable or rotatable visual indicator, etc. Furthermore, the latch indicator 60, including the latch arm 62 or other movable component(s), may be located on the infant carrier 14 or any other infant carrier-receiving component.

In the case of an electronic sensor or switch, the latch indicator 60 may include a contact located on the infant carrier 14 and a contact located on the infant carrier-receiving component such that when the infant carrier 14 is located on the infant carrier-receiving component, the contacts are in contact. A chip, circuit, or other electronic component can then determine that the infant carrier 14 is located on the infant carrier-receiving component, and thereby send a signal to the latch indicator 60 to cause a change in the state or in a visual characteristic of the latch indicator 60.

In addition, the indicator 60 may include a light that lights up and/or does not light up depending upon the position of the infant carrier 14. For example, the light may be a red light that is generally visible when the infant carrier 14 is not located on the infant carrier, and the red light may turn off or be generally obscured when the infant carrier 14 is located on the stroller. Alternately, of course, the light may be a green light that is generally visible when the infant carrier 14 is located on the infant carrier, and the green light may be turned off or be generally obscured when the infant carrier 14 is not located on the infant carrier. Alternately, the light may switch between green and red depending upon the location of the infant carrier. The indicator may also include an LED, or a screen which provides text messages (i.e. "latched" or "not latched"). The latch indicator 60 may also include a buzzer or other component that outputs an audio signal that is emitted when the infant carrier 14 is and/or is not located on the infant carrier-receiving component.

As shown in FIGS. 7 and 8, the latch indicator 60 can also be located on the car seat base 54 to provide feedback when the infant carrier 14 is and/or is not located on or coupled to the car seat base 54. Furthermore, although the infant carrier 14 is shown as being coupled to a stroller 10 and a car seat base 54, it should be understood that the infant carrier 14 may also be shaped to be coupled to nearly any other structure or frame, including but not limited to, high chairs, swings, or other structures, and any component to which the infant carrier may be coupled may include the latch indicator 60 located thereon. The latch indicator 60 (including the window 32 and/or movable portions thereof, such as the latch arm 62) may also be located on the infant carrier 14.

Having described the invention in detail and by reference to the preferred embodiments, it will be apparent that modifications and variations thereof are possible without departing from the scope of the invention.

What is claimed is:

1. An infant carrier-receiving component comprising:
   a frame shaped to receive an infant carrier thereon; and
   an indicator located on at least one of said infant carrier and said frame, wherein said indicator is automatically repositionable between a first position and a second position, wherein said indicator is operative to travel between said first position and said second position to indicate when said infant carrier is located in said first position on said frame and indicate when said infant carrier is located in said second position different than said first position.

2. The component of claim 1 wherein said indicator includes a notification portion that is generally visible when said infant carrier is located in said first position or is not located in said first position, and wherein said notification portion is generally not visible when said infant carrier is in the other of said first position or not said first position.

3. The component of claim 2 wherein said indicator includes a movable portion that is positioned in a first orientation when said carrier is located in said first position and that is positioned in a second orientation when said infant carrier is not located in said first position.

4. The component of claim 3 wherein the movement of said movable portion causes said notification portion to be generally visible or generally not visible.

5. The component of claim 4 wherein said notification portion is located on said movable portion.

6. The component of claim 5 wherein said movable portion is a pivotable arm, and wherein said notification portion is located at a distal end thereof.

7. The component of claim 4 wherein one of said component or said infant carrier includes a magnetic component and the other of said component or infant carrier includes a component that is located to interact with said magnetic component when said infant carrier is located in said first position to cause said movable portion to move to said first orientation.

8. The component of claim 3 wherein said movable component is biased into one of said first or second orientations.

9. The component of claim 2 wherein said frame includes a transparent portion, and wherein when said notification portion is visible said notification portion may be visible through said transparent portion.

10. The component of claim 2 wherein said notification portion includes a visual property that is different from the surrounding portions of said frame.

11. The component of claim 1 wherein said frame is mounted to a stroller body which includes a set of wheels and a handlebar shaped and located to be gripped by an operator such that said stroller body can be rolled in a desired direction.

12. The component of claim 11 wherein said frame includes a retraining bar shaped to be located in front of an occupant of said infant carrier, and wherein at least part of said indicator is located on said retaining bar.

13. The component of claim 1 wherein said frame is mounted to a car seat base body that is shaped to be mounted to an automotive vehicle seat, and wherein said car seat base body includes a belt path shaped and located to receive an automotive vehicle seat belt therein to mount said car seat base body to said automotive vehicle seat.

14. The component of claim 13 wherein said car seat base body includes a recess shaped to receive said infant carrier therein and a locking mechanism shaped to releasably mount said infant carrier to said car seat base body.

15. The component of claim 1 further comprising a switch located at least partially on at least one of said frame and said infant carrier for detecting when said infant carrier is located in said first position on said frame, and wherein said switch is in electrical communication with said latch indicator.

16. The component of claim 15 wherein said switch includes a contact located on said frame and a contact located on said infant carrier, said contacts being arranged to contact one another when said infant carrier is located in said first position on said frame.

17. The component of claim 1 wherein said indicator includes a notification portion that is either in a generally visible or a generally not visible state when said infant carrier is located in said first position, and wherein said notification is in the other of said generally visible or generally not visible state when said infant carrier is not located in said first position.

18. The component of claim 1 wherein said indicator includes a first notification portion that is generally visible when said infant carrier is located in said first position, and wherein said first notification portion is generally not visible when said infant carrier is not in said first position, and wherein said indicator includes a second notification portion that is generally visible when said infant carrier is not located in said first position, and wherein said second notification portion is generally not visible when said infant carrier is in said first position.

19. The component of claim 1 wherein said first position is a position wherein said infant carrier is mounted to said frame.

20. The component of claim 1 wherein said component is shaped to releasably receive said infant carrier thereon, and wherein at least one of said component and said infant carrier includes a locking mechanism for releasably mounting said infant carrier to said component.

21. The component of claim 1 wherein said frame includes at least one of a latch shaped to cooperate with a latch-receiving component of an infant carrier and a latch-receiving component shaped to cooperate with a latch of an infant carrier to couple said infant carrier to said frame, and wherein said indicator is at least partially spaced apart from said latch or said latch-receiving component of said frame.

22. The component of claim 1 wherein said frame includes at least one of a latch shaped to cooperate with a latch-receiving component of an infant carrier and a latch-receiving component shaped to cooperate with a latch of an infant carrier to couple said infant carrier to said frame, and wherein said indicator can indicate when said infant carrier is located in said first position relative to said frame independently of the status of said latch or said latch-receiving component.

23. An infant carrier system comprising:
an infant carrier shaped to securely receive an infant therein;
a frame shaped to removably receive said infant carrier thereon; and
an indicator located on at least one of said frame and said infant carrier, wherein said indicator visually indicates when said infant center is at least one of mounted to said frame and dismounted from said frame.

24. The system of claim 23 wherein one of said frame or said infant carrier includes a latch and the other of said frame or said infant carrier includes a latch-receiving component which can cooperate with said latch to couple said infant carrier to said frame, and wherein said indicator is at least partially spaced apart from said latch and said latch-receiving component.

25. The system of claim 23 wherein one of said frame or said infant carrier includes a latch and the other of said frame or said infant carrier includes a latch-receiving component which can cooperate with said latch to couple said carrier to said frame, and wherein said indicator can indicate when said infant carrier is located in said first position relative to said frame independently of the status of said latch or said latch-receiving component.

26. The system of claim 23 wherein said infant carrier includes a pivotable handle, and wherein said indicator indicates when said infant carrier is located in said first position independently of the position of said handle.

27. The system of claim 23 wherein said infant carrier includes a handle, and wherein said indicator is generally spaced away from said handle.

28. An infant carrier-receiving component comprising:
a frame shaped to receive an infant carrier thereon; and an indicator located on said frame, wherein said indicator indicates when said infant carrier is located in a predetermined position on said frame, wherein said indicator includes a notification portion that is generally visible when said infant carrier is located in said predetermined position or is not located in said predetermined position, wherein said notification portion is generally not visible when said infant carrier is in the other of said predetermined or not predetermined position, and wherein said indicator includes a movable portion that is located in a first position when said carrier is located in said predetermined position and that is located in a second position when said infant carrier is not located in said predetermined position.

29. The component of claim 28 wherein the movement of said movable portion causes said notification portion to be generally visible or generally not visible.

30. The component of claim 29 wherein said notification portion is located on said movable portion.

31. The component of claim 30 wherein said movable portion is a pivotable arm, and wherein said notification portion is located at a distal end thereof.

32. The component of claim 29 wherein one of said component or said infant carrier includes a magnetic component and the other of said component or infant carrier includes a component that is located to interact with said magnetic component when said infant carrier is located in said predetermined position to cause said movable portion to move to said first position.

33. The component of claim 28 wherein said movable component is biased into one of said first or second positions.

34. An infant carrier comprising:
a shell adaptively shaped to receive an infant or baby thereon, said shell being shaped to be removably mounted to a frame; and
an automatically repositionable indicator located on said shell, wherein said indicator indicates when said infant carrier is at least one of mounted on said frame and dismounted from said frame.

35. The carrier of claim 21 wherein said infant carrier includes a pivotable handle, and wherein said indicator indicates when said infant carrier is located in said first position independently of the position of said handle.

36. The carrier of claim 21 wherein said infant carrier includes a handle, and wherein said indicator is generally spaced away from said handle.

37. A stroller comprising:
a stroller body including a frame shaped to removably receive an infant carrier thereon, a set of wheels, and a handlebar shaped and located to be gripped by an operator such that said stroller can be rolled in a desired direction; and
an automatically repositionable indicator located on at least one of said infant carrier and said stroller body, wherein said indicator indicates when said infant carrier is at least one of mounted on said frame and dismounted from said frame.

38. A car seat base comprising:
a base body shaped to removably receive an infant carrier thereon and to be mounted to an automotive vehicle seat, said car seat base body including a belt path shaped and located to receive an automotive vehicle seat belt therein to mount said car seat base body to said automotive vehicle seat; and
an automatically repositionable indicator located on at least one of said infant carrier and said base body, wherein said indicator indicates when said infant carrier is at least one of mounted on said base body and dismounted from said base body.

39. An infant carrier-receiving component comprising:
a frame shaped to receive an infant carrier thereon; and
an indicator located on said frame, wherein said indicator indicates when said infant carrier is located in a predetermined position on said frame, wherein said indicator includes a notification portion that is generally visible when said infant carrier is located in said predetermined position or is not located in said predetermined position, wherein said notification portion is generally not visible when said infant carrier is in the other of said predetermined or not predetermined position, wherein said frame includes a transparent portion, and wherein when said notification portion is visible said notification portion may be visible through said transparent portion.

40. An infant carrier-receiving component comprising:
a frame shaped to receive an infant carrier thereon; and
an indicator located on said frame, wherein said indicator indicates when said infant carrier is located in a predetermined position on said frame, wherein said indicator includes a first notification portion that is generally visible when said infant carrier is located in said predetermined position, wherein said first notification portion is generally not visible when said infant carrier is not in said predetermined position, wherein said indicator includes a second notification portion that is generally visible when said infant carrier is not located in said predetermined position, and wherein said second notification portion is generally not visible when said infant carrier is in said predetermined position.

41. An infant carrier-receiving component comprising:
a frame shaped to receive an infant carrier thereon; and
an indicator located on said frame, wherein said indicator indicates when said infant carrier is located in a predetermined position on said frame, wherein said frame is coupled to a stroller body which includes a set of wheels and a handlebar shaped and located to be gripped by an operator such that said stroller body can be rolled in a desired direction, wherein said frame includes a retraining bar shaped to be located in front of an occupant of said infant carrier, and wherein at least part of said indicator is located on said retaining bar.

* * * * *